(12) United States Patent
Messmer et al.

(10) Patent No.: US 8,029,345 B2
(45) Date of Patent: Oct. 4, 2011

(54) FIRE STOP OUTLET FOR SMALL DUCT, HIGH VELOCITY AIR DISTRIBUTION SYSTEMS

(75) Inventors: Craig S. Messmer, St. Louis, MO (US); Josh J. Riley, St. Louis, MO (US)

(73) Assignee: Unico, Inc., St. Louis, MO (US)

( * ) Notice: Subject to any disclaimer, the term of this patent is extended or adjusted under 35 U.S.C. 154(b) by 1338 days.

(21) Appl. No.: 11/536,819

(22) Filed: Sep. 29, 2006

(65) Prior Publication Data

US 2008/0078841 A1   Apr. 3, 2008

(51) Int. Cl.
*F24F 13/14* (2006.01)
*F24F 7/00* (2006.01)

(52) U.S. Cl. ......................................... 454/284; 454/286

(58) Field of Classification Search .................. 454/257, 454/256, 258, 369, 342; 52/1; 236/49.2, 236/29.3
See application file for complete search history.

(56) References Cited

U.S. PATENT DOCUMENTS

| | | | |
|---|---|---|---|
| 3,990,464 A | 11/1976 | Jenkins | |
| 4,109,423 A * | 8/1978 | Perrain | 52/1 |
| 4,143,671 A | 3/1979 | Olson | |
| 4,221,092 A | 9/1980 | Johnson | |
| 4,788,800 A | 12/1988 | Whiteley | |
| 4,848,043 A * | 7/1989 | Harbeke | 52/1 |
| 5,155,957 A * | 10/1992 | Robertson et al. | 52/232 |
| 5,452,551 A * | 9/1995 | Charland et al. | 52/232 |
| 5,456,050 A * | 10/1995 | Ward | 52/220.8 |
| 5,505,497 A | 4/1996 | Shea et al. | |
| 5,811,731 A | 9/1998 | Jacques et al. | |
| 5,836,338 A | 11/1998 | Schulze | |
| 6,019,119 A | 2/2000 | Schulze | |
| 6,279,597 B1 | 8/2001 | Schulze | |
| 6,725,615 B1 * | 4/2004 | Porter | 52/232 |
| 6,959,719 B2 | 11/2005 | Truss | |
| 2004/0072538 A1 | 4/2004 | Kennedy et al. | |
| 2004/0149390 A1 * | 8/2004 | Monden et al. | 156/391 |
| 2006/0065304 A1 | 3/2006 | Truss | |

FOREIGN PATENT DOCUMENTS

| | | | |
|---|---|---|---|
| GB | 2334770 A * | 9/1999 | |
| GB | 2415245 A * | 12/2005 | |
| WO | 2004015319 A1 | 2/2004 | |

OTHER PUBLICATIONS

Bulletin 20-65 Round Outlets, Unico System, May 2004.*
LVH-O Series Intumescent Fire Dampers, Circular Fire Dampers; article published in Jul. 2001 issue of Air Transfer Technology; copyright 2000 Lorient Australia Pty Ltd.

* cited by examiner

*Primary Examiner* — Steven B McAllister
*Assistant Examiner* — Brittany E Towns
(74) *Attorney, Agent, or Firm* — Thompson Coburn LLP

(57) ABSTRACT

A fire stop apparatus for a small duct, high velocity air distribution system is assembled to a duct opening and includes a cylindrical support wall that supports a cylindrical band of intumescent material that expands and closes the duct opening when subjected to the heat of a fire.

6 Claims, 4 Drawing Sheets ized metal.
FIRE STOP OUTLET FOR SMALL DUCT, HIGH VELOCITY AIR DISTRIBUTION SYSTEMS

BACKGROUND OF THE INVENTION (1) Field of the Invention

The present invention pertains to a fire stop outlet for a small duct, high velocity air distribution system. In particular, the present invention pertains to a fire stopping apparatus that is assembled to a duct opening and is communicated with a high velocity air duct. The fire stopping apparatus comprises a cylindrical metal wall supporting a cylindrical band of intumescent material that expands and closes the air duct opening when subjected to the heat of a fire.

(2) Description of the Related Art

Fire damper assemblies are often used at the air outlets or air inlets of heating and cooling air distribution systems for buildings. The typical fire damper assembly includes one or more dampers positioned in an air distribution system opening. The dampers are held in an open position to allow the free flow of air through the opening. However, when the damper assembly is subjected to intense heat resulting from a fire in the building, the heat triggers a release mechanism of the damper assembly and the dampers automatically move to closed positions in the air distribution system opening. This prevents fire on one side of a wall or a ceiling panel from passing through the air distribution opening to the opposite side of the wall or ceiling panel.

Use of the prior art fire damper assemblies is not practical in air distribution systems that are small duct, high velocity systems. In small duct, high velocity air distribution systems, the duct openings are much smaller, with a duct opening usually having less than six square inches of open area. The prior art fire damper assemblies are too large to be used in such a small opening, and it is impractical to design a fire damper assembly that is sufficiently reduced in size to be used in the smaller, typically circular opening of a small duct, high velocity air distribution system.

SUMMARY OF THE INVENTION

The fire stopping apparatus of the invention provides a heat responsive means for automatically closing a small air duct opening of a small duct, high velocity air distribution system without using a fire damper apparatus. The fire stopping apparatus of the invention uses intumescent material that expands and chokes off the air duct opening in the presence of heat. Intumescent material has been used as a fire stop material for wall or ceiling openings around piping, electrical wiring, and air distribution conduits. However, intumescent material has not been used to close off an air duct outlet. The present invention provides a novel apparatus that uses intumescent material to automatically close an air duct outlet when heat is sensed, and in particular an air duct outlet of a small duct, high velocity air distribution system.

The apparatus of the invention is comprised of four basic components that include: an air duct terminal, a support that is attached to the air duct terminal, a band of intumescent strip that is held by the support around the air duct terminal, and fire-rated caulk. The air duct terminal may be used as an air outlet or an air inlet of a small duct, high velocity air distributor system.

The air duct terminal is similar to air duct terminals used in small duct, high velocity air distribution systems. The terminal has an annular flange with a center opening. The flange is secured over an opening for a small duct, high velocity air distribution system in a wall or ceiling. A tube extends from the flange center opening. The tube is connected to the air duct of the air distribution system. In the preferred embodiment of the invention, the air duct terminal is constructed of plastic.

The support has an annular rim that is attached to the flange of the air duct terminal. The support also has a cylindrical wall that projects from the rim and extends around a portion of the air terminal tube. The dimensions of the wall space the wall radially outwardly from the tube. In the preferred embodiment of the invention, the support is constructed of galvanized metal.

The intumescent strip is formed in a continuous cylindrical band. The band of material is positioned between the tube of the air duct terminal and the wall of the support. The intumescent material band is supported by the support cylindrical wall with the band extending completely around the air duct terminal tube.

The fire-rated caulk is used to adhere the annular rim of the support to the back of the air duct terminal flange. The caulk maintains a fireproof seal between the support and the air duct terminal, and seals any cracks or openings in the apparatus.

When the apparatus is subjected to the heat of a fire, the intumescent material reacts to the heat and begins to expand. The cylindrical metal wall of the support limits the expansion of the intumescent material to the area within the support wall. As the plastic tube of the air duct terminal heats and melts or burns away, the intumescent material expands into the volume previously occupied by the air duct terminal tube, thereby closing the opening through the air duct terminal. In this way, the apparatus of the invention closes the opening in the wall or ceiling provided for the small duct, high velocity air distribution system.

BRIEF DESCRIPTION OF THE DRAWINGS

Further features of the invention are set forth in the following detailed description of the preferred embodiment of the invention and in the drawing figures.

DETAILED DESCRIPTION OF THE PREFERRED EMBODIMENT

Figure 1:
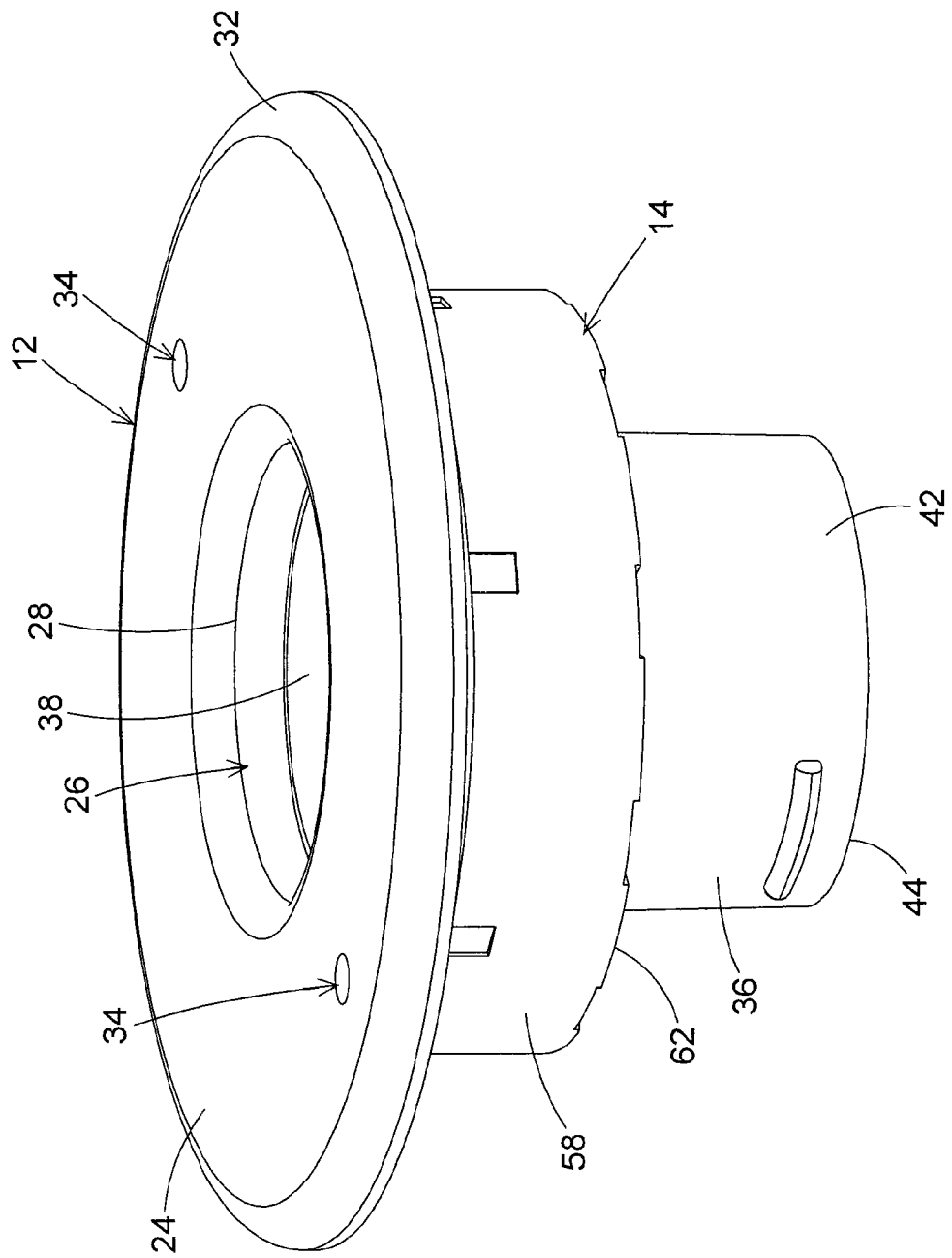
FIG. 1 shows a side perspective view of the fire stopping apparatus for a small duct, high velocity air distribution system.
Figure 2:
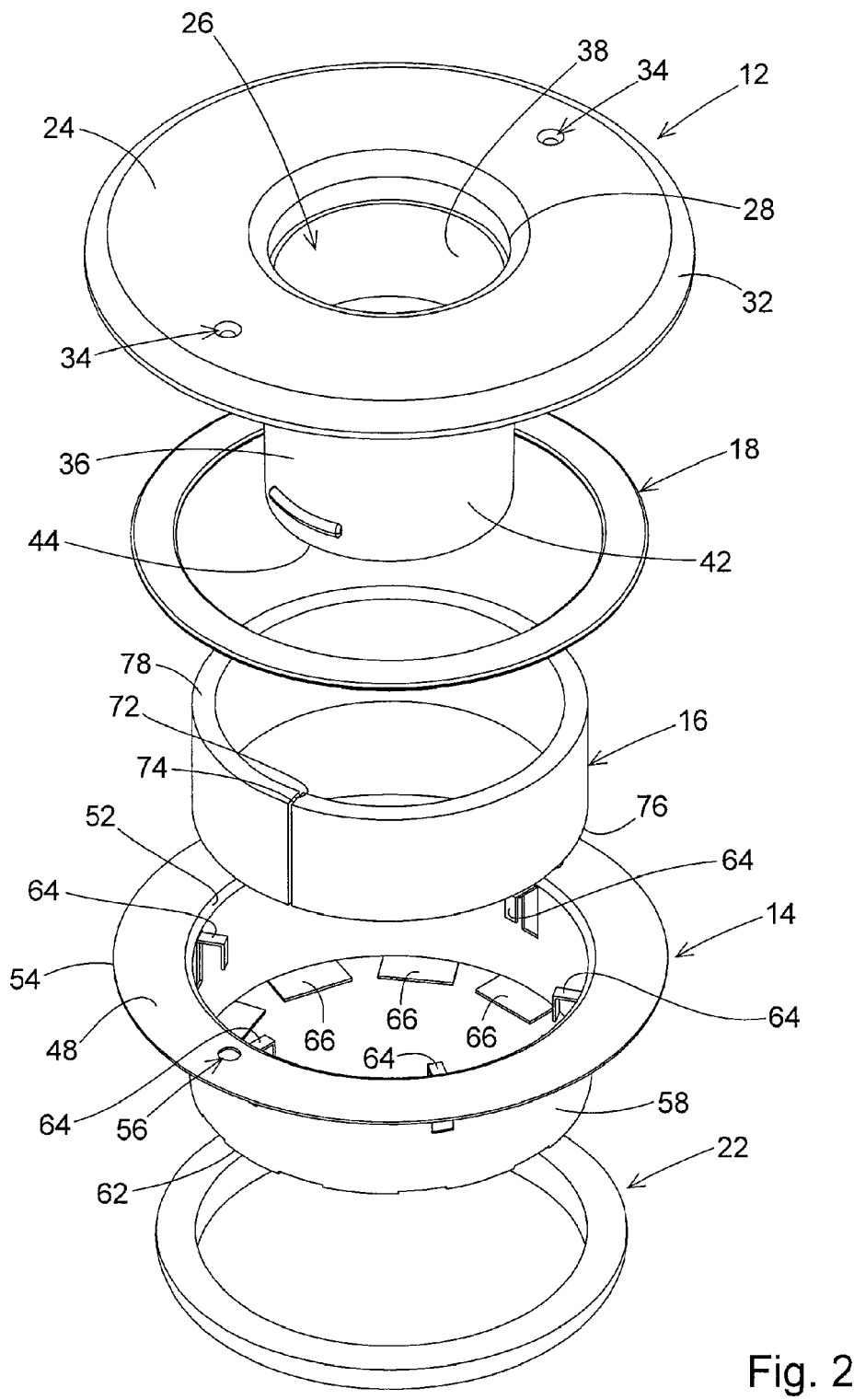
FIG. 2 shows a top perspective view of the disassembled component parts of the apparatus.
Figure 3:
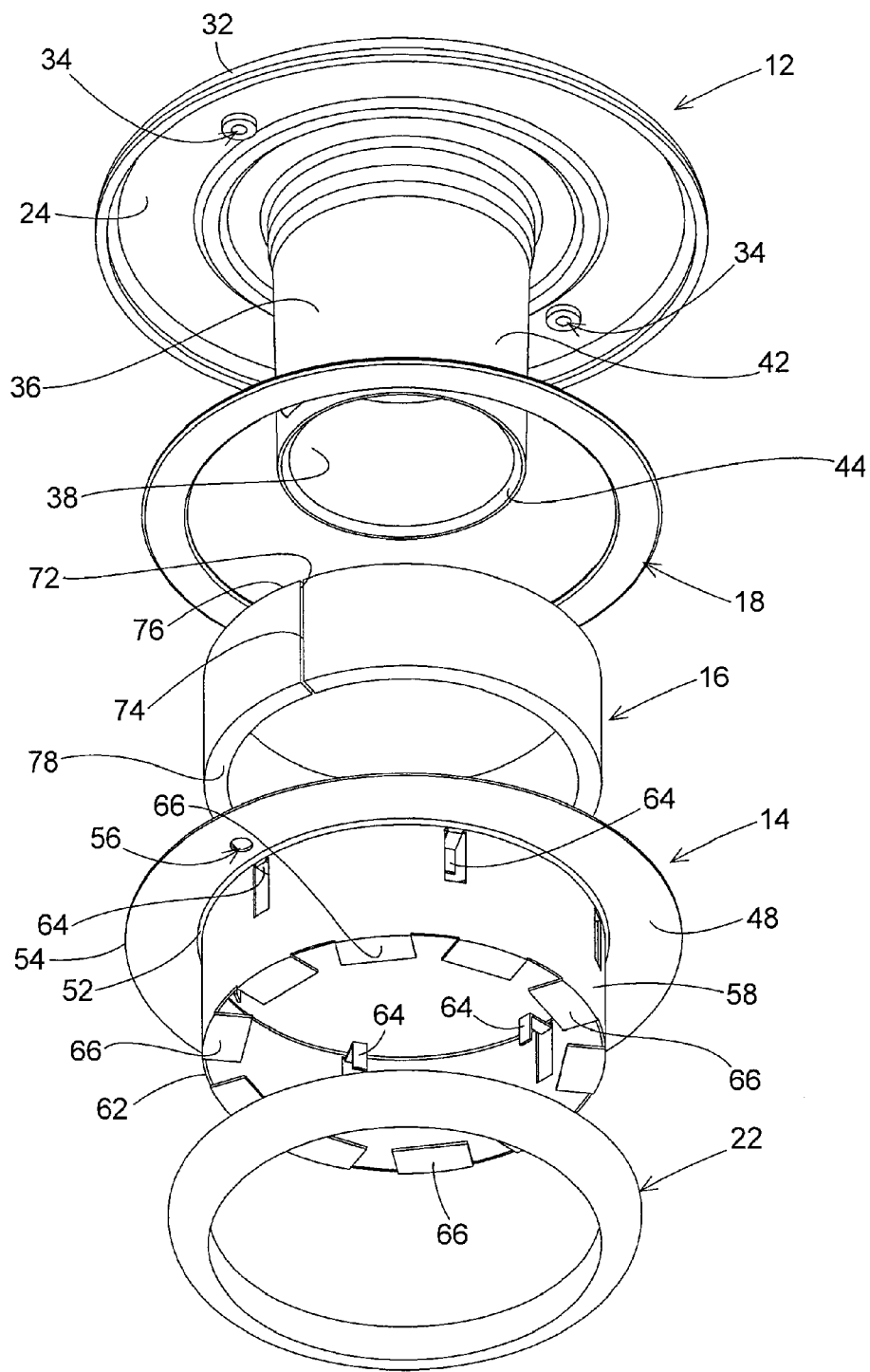
FIG. 3 shows a bottom perspective view of the disassembled component parts of the apparatus.

FIGS. 2 and 3 show the component parts of the preferred embodiment of the fire stopping apparatus of the invention. In the preferred embodiment, the apparatus is comprised of an air duct terminal 12, a support 14 that is attached to the air duct terminal, and a strip of intumescent material 16. In addition to the above basic component parts of the apparatus, first 18 and second 22 circular beads of fire-rated caulk, i.e., fireproof caulk, can also be used with the apparatus. The first bead of caulk 18 is used to adhere the duct terminal 12 to the support 14, and the second bead of caulk 22 is used to seal around the support 14.

The air duct terminal 12 is similar in construction to air duct terminals used in small duct, high velocity air distribution systems. The terminal 12 is constructed of a plastic material typically used for such terminals. A flat annular flange 24 of the terminal surrounds a center opening 26 of the terminal. The flange 24 has a circular inner edge 28 that surrounds the terminal center opening 26, and a radially outwardly spaced circular outer edge 32. A pair of fastener holes 34 pass through the flange 24 on diametrically opposite sides of the flange opening 26. The flange outer edge 32 is dimensioned to enable the flange 24 to cover over an air duct opening in a building wall or ceiling of a small duct, high velocity air distribution system.

The air duct terminal 12 has a tube 36 that projects from a side of the terminal flange 24 that covers over the air duct opening in use of the terminal. The tube 36 has a cylindrical interior surface 38 that joins with the flange opening 26 at the flange inner edge 28. The tube interior surface 38 defines an interior bore through the tube. The tube 36 has a cylindrical exterior surface 42 and has a length dimension that extends from the terminal flange 24 to a circular distal end 44 of the tube. The dimension of the tube length is determined to provide a portion of the tube exterior surface 42 for attachment to an air duct conduit, as will be explained.

The support 14 is constructed of a fire resistant material, and is preferably constructed of galvanized metal. The support 14 has a flat annular rim 48 that is dimensioned to fit against the terminal flange 24 around the terminal tube 36. The rim 48 has a circular inner edge 52 surrounding a center opening of the rim, and a circular outer edge 54 that is spaced radially outwardly from the rim inner edge 52. The dimensions of the support rim inner edge 52 are larger than the dimensions of the terminal flange inner edge 28, which spaces the rim inner edge 52 radially outwardly from the terminal flange inner edge 28 when the support rim 48 is attached to the flange 24. The dimensions of the support rim outer edge 54 are smaller than those of the terminal flange outer edge 32, resulting in the terminal flange 24 covering over the support rim 48 when the support rim 48 is attached to the flange 24. A pair of fastener holes 56 pass through the support rim 48 at positions that correspond to the fastener holes 34 of the terminal flange 24.

A cylindrical support wall 58 projects from the support rim 48. The support wall 58 extends from the support rim inner edge 52 to a circular distal edge 62 of the wall. The wall 62 has a length from the support rim 48 to the wall distal edge 62 that is slightly shorter than the length of the terminal tube 36.

A plurality of tabs 64 are cut from the cylindrical wall 58 and are bent to project inwardly from the rim inner edge 52 and the support wall 58. Each of the tabs 64 is bent in a general L-shape and projects from the support rim inner edge 52 into the interior of the support wall 58.

A plurality of flaps 66 project inwardly from the distal edge 62 of the support wall 58. The flaps 66 each have a general rectangular configuration, and are circumferentially spaced from each other around the support wall distal edge 62.

The intumescent material strip 16 is constructed of any known material that is fireproof and expands when subjected to the heat of fire. The strip 16 has a sufficient length between opposite ends 72, 74 of the strip that enables the strip to be formed in a continuous cylindrical band that extends around the air terminal tube as shown in the drawing figures. In addition, the length of the strip 16 between its opposite ends 72, 74 enables the cylindrical band formed by the strip to fit inside the cylindrical wall 58 of the support 14 between the plurality of flaps 66 and the plurality of tabs 64 projecting from the support wall. One annular edge 76 of the band of material engages against the plurality of flaps 66 and the opposite annular edge 78 of the band of material engages inside the L-shaped tabs 64, whereby the support wall 58 supports the intumescent material. With the band of intumescent material 16 assembled to the interior of the support wall 58, the intumescent material 16 is held in position between the support wall 58 and the air terminal tube 36.

In assembling the above-described component parts of the apparatus, the first circular bead of fire-rated caulk 18 is applied between the terminal flange 24 and the support rim 48. The caulk 18 is compressed between the flange 24 and rim 48, causing the caulk 18 to spread out radially between the flange and rim. In this manner, the caulk 18 maintains a fireproof seal between the flange 24 and the rim 48, and seals any cracks or openings between the flange 24 and the rim 48.

A pair of threaded fasteners 82 are inserted through the flange fastener holes 34 and the rim fastener holes 58. The fasteners 82 are used in attaching the apparatus over an air duct terminal opening in a wall or ceiling of a building. The fasteners 82 extend through the first bead of caulk 18 and the caulk seals around the fasteners.

Figure 4:
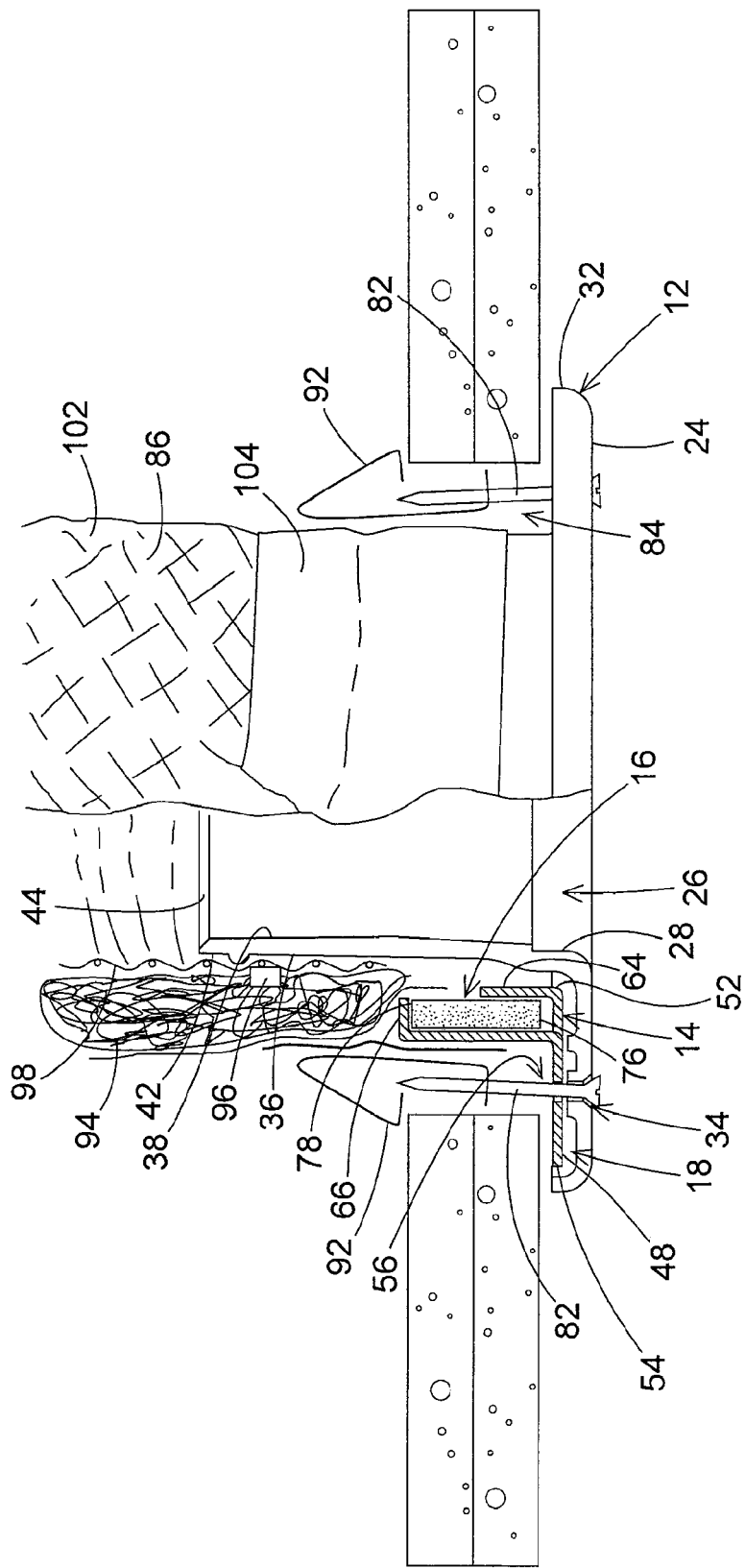
FIG. 4 shows a side, partially sectioned view of the apparatus assembled into an opening of a small duct, high velocity air distribution system.

FIG. 4 shows the assembled apparatus of the invention attached over an air duct opening 84 in a wall or ceiling and communicating with an air duct 86 inside the wall or ceiling. FIG. 4 shows only one example of how the apparatus of the invention may be used. The apparatus of the invention should not be interpreted as being limited to only the use shown in FIG. 4.

Prior to insertion of the apparatus into the air duct opening 84, the first bead of caulk 18 is compressed between the terminal flange 24 and the support rim 48, and the fasteners 82 are inserted through the aligned flange holes 34 and rim holes 56. The second circular bead of fire-rated caulk 22 may be applied around the exterior of the support wall 58. The second bead of caulk 22 seals over the openings in the support wall 58 left by the L-shaped tabs 64 and seals any seams where the support rim 48 meets the support wall 58.

A pair of single-sided toggles 92 are assembled to the pair of fasteners 82 on opposite sides of the apparatus. The toggles 92 are inserted through the air duct opening 84 and engage against the opposite side of the air duct opening from the terminal flange 24. With the toggles 92 so positioned, the fasteners 82 are tightened so that the toggles 92 engage firmly against one side of the wall or ceiling, and the terminal flange 24 and support rim 48 engage firmly against the opposite side of the wall or partition. This firmly secures the apparatus in the air duct opening 84 with the terminal flange 24 covering over the air duct opening and the terminal tube 36 extending through the air duct opening.

In the example of the attachment of the air duct 86 to the air terminal tube 36 shown in FIG. 4, the outer insulation layer 94 of the air duct was previously peeled back and a metal hose clamp 96 is used to secure the inner duct layer 98 around the terminal tube 36. The air duct insulation layer 94 is then pulled back over the metal hose clamp 96, the air duct inner layer 98, and the portion of the terminal tube 36 that projects outwardly from the support cylindrical wall 58. The air duct insulation layer 94 and an outer vapor barrier 102 of the air duct are inserted into and between the support wall 58 supporting the band of intumescent material 16 and the terminal tube 36. The air duct vapor barrier 102 is then secured to the outside of the support cylindrical wall 58 by a strip of fireproof aluminum tape 104, completing the installation of the apparatus to the air duct opening 84 and the air duct 86.

When the installed apparatus is subjected to the heat of a fire, the duct terminal 12 will either catch fire or soften from the heat. The first bead of caulk 18 will then fail, and the duct terminal 12 will fall away from the air duct opening 84, leaving an empty space in the air duct opening. The toggles 92 and the screws 82 continue to secure the support 14 to the structure surrounding the air duct opening 84. The air duct 86 continues to be attached to the apparatus by the aluminum foil tape 104 connecting the air duct to the support 14. The air duct 86 remains attached to the support 14 by the tape 104 for a sufficiently long time period to allow the intumescent material band 16 to react with the heat of the fire and expand to the extent that it completely seals closed the opening 84 against the fire. The cylindrical metal wall 58 of the support limits the expansion of the intumescent material 16 to the area within the support wall 58. As the plastic tube 36 of the air duct terminal 12 heats and melts or burns away, the intumescent material 16 expands into the volume previously occupied by the air duct tube 36. The expansion of the intumescent material 16 closes the opening through the air duct terminal 12. In this way, the apparatus of the invention closes the opening 84 in the wall or ceiling provided for the air duct 86 of the small duct, high velocity air distribution system.

Although the apparatus of the invention and its method of use have been described above by reference to a particular embodiment of the invention, it should be understood that modifications and variations could be made to the invention without departing from the intended scope of the application claims. The drawings show the preferred embodiment of the apparatus. However, changes could be made to the component parts of the apparatus. For example, the support 14 could also be stamped as a one-piece component with continuous flanges projecting outwardly from the support wall 58 in place of the support rim 58 and the support wall flap 66. The inner tabs 64 of the support would then secure the intumescent material 16 from falling from the support 14 and the air duct terminal 12. Separate wire ties could also be used for this function, or separate bent tabs could be attached to the inside surface of the support wall and secured by the perimeter of the intumescent tape 104.

The invention claimed is:

1. A fire stopping apparatus for an air duct opening, the apparatus comprising:
    a tubular air duct terminal that is attachable in an air duct opening and is attachable to an air duct, the air duct terminal having an annular flange with a circular inner edge that surrounds a center opening of the air duct terminal and a radially outwardly spaced circular outer edge, the annular flange having one side that is dimensioned to cover over the air duct opening in use of the air duct terminal and the air duct terminal having a tube that projects from the one side of the annular flange, the tube having a cylindrical interior surface that joins with the annular flange circular inner edge at the annular flange center opening;
    intumescent material extending around the air duct terminal tube;
    a support attached to the air duct terminal and attached to the intumescent material, the support holding the intumescent material in position around the air duct terminal tube, the support having a rim that is attached to the one side of the air duct terminal annular flange and positions the support holding the intumescent material around the air duct terminal tube; and,
    a circular bead of fireproof caulk applied between the one side of the air duct terminal annular flange and the support rim with the chalk pressed between the annular flange and the support rim and providing a fireproof seal between the flange and rim.

2. The apparatus of claim 1, further comprising:
the intumescent material being a continuous band that is positioned between the air duct terminal tube and the support.

3. The apparatus of claim 2, further comprising:
the intumescent material being fireproof and swelling in response to heat.

4. The apparatus of claim 1, further comprising:
the air duct terminal annular flange being dimensioned larger than an outer edge of the support to cover over the air duct opening and the support when the air duct terminal is attached to the air duct opening.

5. The apparatus of claim 4, further comprising:
the air duct terminal tube being attachable to the air duct when the air duct terminal is attached to the air duct opening.

6. The apparatus of claim 1, further comprising:
the support having a cylindrical wall projecting from the rim and extending around the air duct terminal tube.

* * * * *